Jan. 24, 1933.  W. C. NABORS  1,895,170
VEHICLE
Filed Dec. 30, 1930
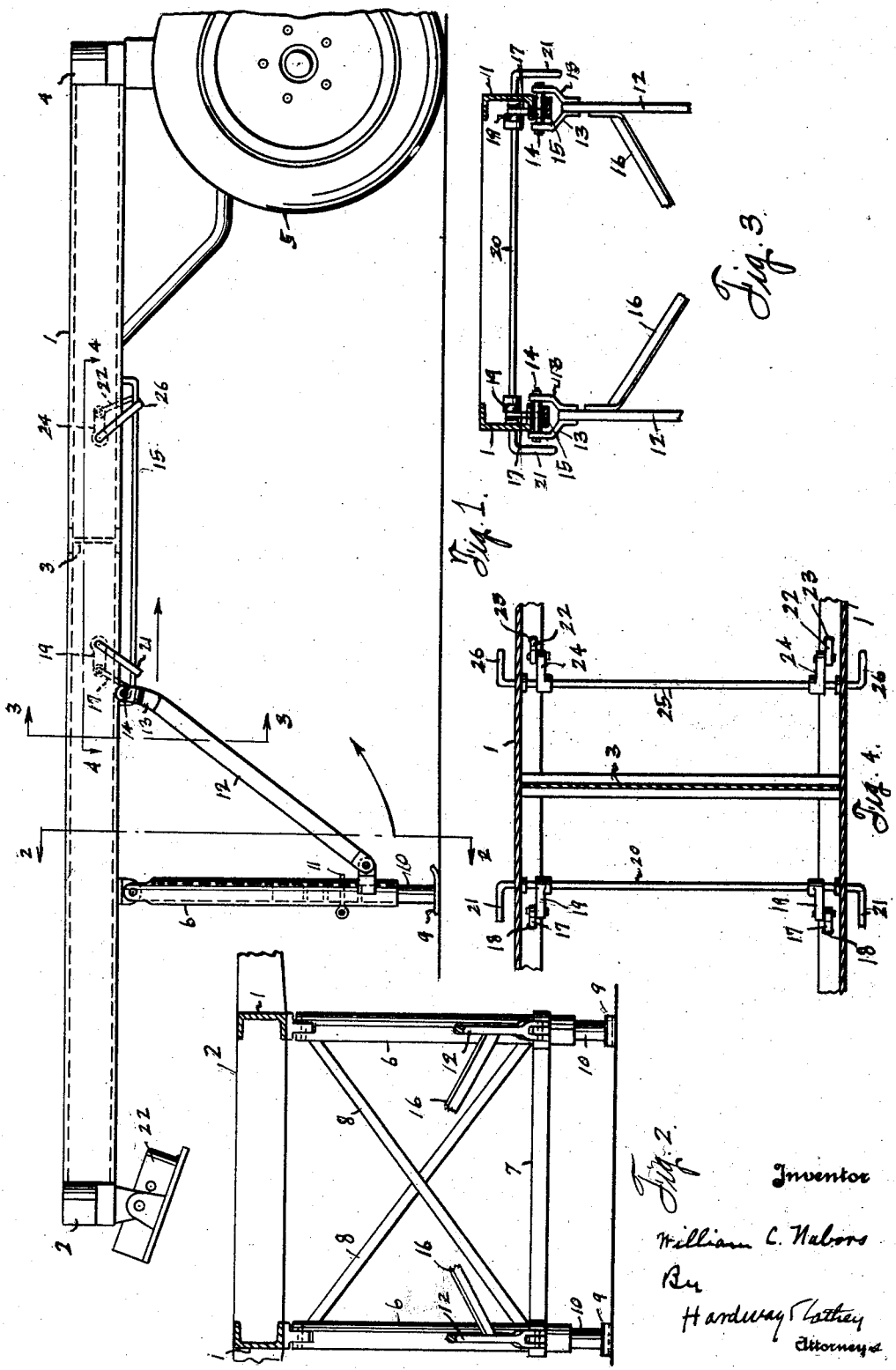

Patented Jan. 24, 1933

1,895,170

UNITED STATES PATENT OFFICE

WILLIAM C. NABORS, OF MANSFIELD, LOUISIANA

VEHICLE

Application filed December 30, 1930. Serial No. 505,527.

This invention relates to vehicles, and has particular relation to a novel type of trailer.

One object of the invention is to provide a trailer of the character described having novel means for supporting the forward end thereof when the trailer is disconnected from the tractor or other draft vehicle in front.

A further object of the invention is to provide a trailer having supporting legs at the forward end thereof, whereby the trailer either loaded or without a load may be supported with its forward end in position to be coupled to the draft vehicle in front.

A still further feature of the invention resides in the provision of such supporting legs with means for maintaining the same in active or supporting position, or in inactive, or folded position.

With the above and other objects in view, the invention has particular relation to certain novel features of construction, operation and arrangement of parts, an example of which is given in this specification and illustrated in the accompanying drawing, wherein—

Figure 1 shows a side view of the trailer.

Figure 2 shows a fragmentary vertical sectional view, taken on the line 2—2 of Figure 1.

Figure 3 shows a fragmentary vertical sectional view, taken on the line 3—3 of Figure 1, and Figure 4 shows a fragmentary horizontal sectional view taken on the line 4—4 of Figure 1.

Referring now more particularly to the drawing, wherein like numerals of reference designate similar parts in each of the figures, the numerals 1, 1 designate the side members of the framework of the trailer which are preferably formed of channel iron. These side members are suitably connected together by the forward cross member 2, the intermediate cross member 3, and the rear cross member 4. The rear end of the trailer frame is supported on the usual ground wheels 5, in any selected manner.

There are the front supporting legs 6, 6 arranged near the forward end of the trailer frame. The upper ends of these legs are pivoted to the respective side members 1 and their lower ends may be connected by a cross bar 7. These legs may be anchored together by means of crossed truss bars 8, 8 if desired. The legs are preferably tubular in form and at their lower ends may have the supporting feet 9, 9 having the shanks 10, 10 which telescope up into the corresponding legs and are adjustably connected thereto by means of cross pins as 11. Associated with the respective legs are the corresponding links 12, 12. The lower ends of these links are pivoted to the respective legs and their upper ends are bifurcated forming the spaced fingers 13, 13 which are connected by the bearing rods 14. The fingers of each link embrace a corresponding track 15 on which the corresponding bearing rod 14 rides. The tracks 15 are secured, at their respective ends to, and depend from, the corresponding side members 1. The links 12 may be connected and reinforced by suitable crossed truss bars 16, 16, if desired.

When the legs 6 are in vertical or supporting position, the bearing rods 14 will be at the forward ends of the tracks 15 and will be maintained in such position by means of the retaining dogs 17 which work through bearings 18, 18 in the lower flanges of the side members 1 and whose lower ends normally engage behind said bearing rods 14. The upper ends of the dogs 17 are pivoted to the forwardly extending arms 19 which are fixed to the transverse rod 20. This rod works in transversely aligned bearings in the side members 1 and its ends have overturned handles 21, 21.

The forward end of the trailer frame has the depending coupling 22 whereby the trailer may be coupled to a tractor in front, and when this coupling is effected the forward end of the trailer frame will be slightly elevated to carry the feet 9 clear of the ground and the forward end of the trailer will then be supported by the tractor. Thereupon, the rod 20 may be partly rotated through one of the handles 21 to elevate the dogs 17 and the legs 6 may then be swung rearwardly and upwardly as indicated by the arrow in Figure 1 and the bearing rods 14 will thereupon slide along the tracks 15 toward the rear end thereof.

At the rear end of said tracks there are the dogs 22, 22 which work, approximately vertically, through the bearings 23, 23 of the lower flanges of the side members 1, 1. The upper ends of these dogs 22 are pivoted to the rear ends of the arms 24, 24. Said arms are fixed to the cross rod 25 which work in transversely aligned bearings in the side members 1 and whose ends are overturned forming the handles or grips 26. One of the grips 26 may be elevated to elevate the dogs 22, and when the legs 6 are swung upwardly to their final positions, the grip 26 may be released and the weight of said grips or handles will cause the lower ends of the dogs 22 to engage in front of the bearing rods 14 and said legs will thereby be held in their upper or inactive position. It is to be noted that the handles or grips 21, 26 form weights to normally hold the dogs 17, 22 in their lower or engaging position.

The drawing and description disclose what is now considered to be a preferred form of the invention by way of illustration only, while the broad principle of the invention will be defined by the appended claims.

What I claim is:

1. In a trailer having a frame formed with side members having slots and supporting wheels for the rear end of the frame; supporting legs swingably connected to the frame and movable into one position to support the forward end of the frame and movable into another, or non-supporting position, tracks on the frame, links pivoted to the legs and having means movable along said tracks as the legs are swung from one of said positions to the other position, dogs working through said slots and effective to engage said means to lock said legs in either of said positions, and cross rods, connected to said dogs for controlling the operation thereof.

2. In a trailer having a frame formed with side members and provided with vertical slots and supporting wheels for the rear end of the frame; supporting legs swingably connected to the frame and movable into one position to support the forward end of the frame and movable into another, or nonsupporting, position, tracks on the frame, links pivoted to the legs and having means movable along said tracks as the legs are swung from one of said positions to the other position, transverse rods working through bearings in said side members, dogs working vertically through said slots in said side members, arms fixed to said rods and whose free ends are pivoted to the upper ends of said dogs, the outer ends of said rods having grips whereby the rods may be operated to lift said dogs whereby said dogs may be manipulated into position to engage or release said means to permit or prevent the movement of said means along said tracks.

In testimony whereof I have signed my name to this specification.

WILLIAM C. NABORS.